Dec. 4, 1928.

G. H. HALL 1,693,895

COMBINED PLOW AND SOIL PULVERIZER

Filed Aug. 8, 1927   2 Sheets-Sheet 1

Inventor.
Guy H. Hall.
by Orwig & Hague, Attorneys.

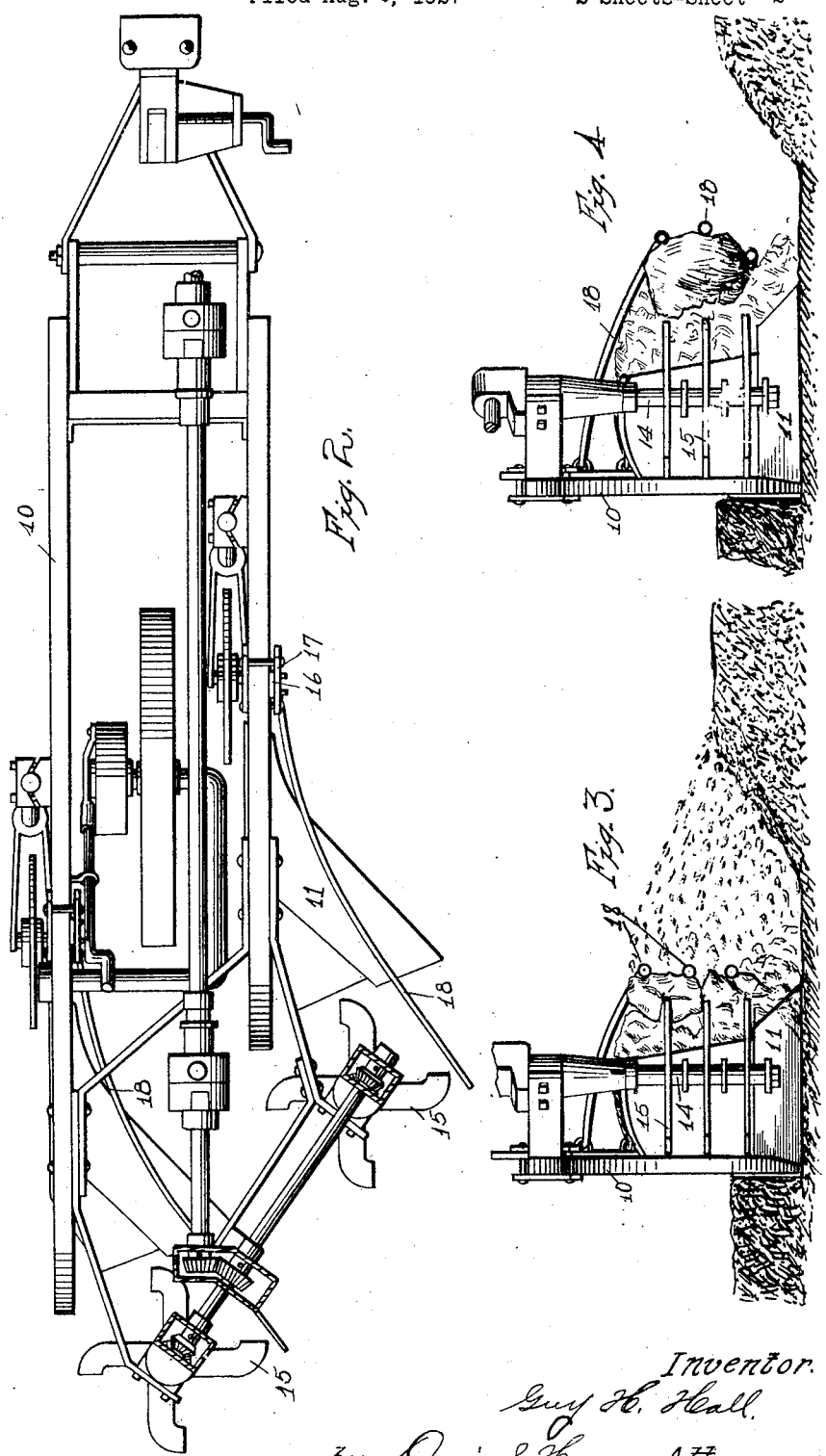

Patented Dec. 4, 1928.

1,693,895

UNITED STATES PATENT OFFICE.

GUY HERRING HALL, OF JACKSON HEIGHTS, NEW YORK.

COMBINED PLOW AND SOIL PULVERIZER.

Application filed August 8, 1927. Serial No. 211,473.

My invention relates to that class of plows and soil pulverizers in which there is located at the rear end of the plow moldboard a series of soil pulverizer blades arranged to rapidly rotate and strike upon the ribbon of soil as it passes from the moldboard with the effect of completing the turning of the soil over into the furrow and pulverizing it.

My object is to provide a device of simple, durable and inexpensive construction that may be used in the nature of an attachment for a plow and soil pulverizer of the class described, when the plow is to be used in earth that is not readily broken up and contains tightly packed clods, or masses of soil or other material, for the purpose of temporarily and yieldingly holding clods of soil or the like in the path of the rapidly rotating blades, to thereby cause such clods to be pulverized before dropping into the furrow; and Further it is my object to provide a device of this character so constructed that when a stone or like substance, which cannot be broken up by the pulverizer blades, is momentarily held in the path of the pulverizer blades, the pressure of the blades upon the stone will cause the holding device to yield, thereby permitting the stone to fall into the furrow without injury to the blades.

My invention consists in the construction, arrangement and combination of the various parts of the device, whereby the objects contemplated are attained, as hereinafter more fully set forth, pointed out in my claims, and illustrated in the accompanying drawings, in which:

Figure 2 shows a top or plan view of same.

Figure 1:
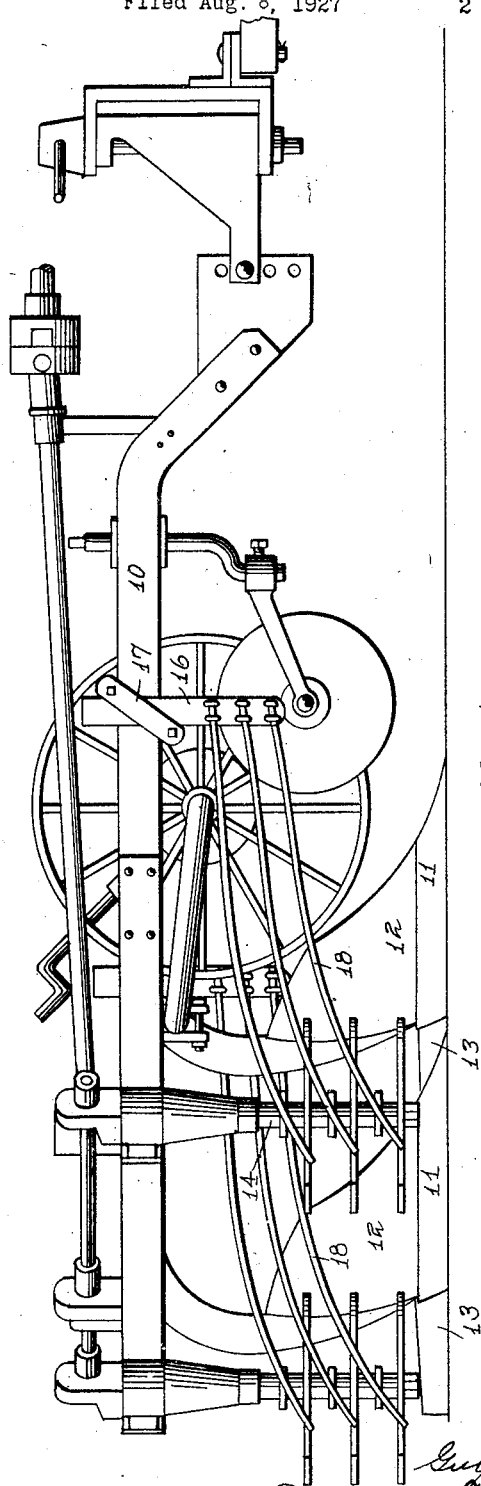
Figure 1 shows a side elevation of a combined plow and soil pulverizer having my improved clod holding attachment applied thereto as in use.

Figure 3 shows a detail view illustrating a rear end elevation of a portion of the plow and soil pulverizer and my improved clod holder applied thereto. In this view there is shown at the land side of the plow a section of earth before being plowed, and on the furrow side a section of earth that has been plowed and pulverized, and between the plow share and furrow there is illustrated a ribbon of earth turned to an elevated position by the plow and being pulverized and thrown laterally in the furrow by the soil pulverizer, and also showing clods of earth temporarily held by the clod holder in position to be repeatedly struck by the pulverizing blades during their passage between the pulverizing blades and the clod holder.

Figure 4 shows a similar view, except that instead of the clods of earth there is illustrated a stone which cannot be broken up by the pulverizing blades, and which is shown in position forced laterally by the impact of the pulverizing blades and thereby springing the clod holder laterally far enough to permit the stone to pass between the pulverizing blades and the clod holder.

Referring to the accompanying drawings, I have used the reference numeral 10 to indicate generally a wheeled plow frame. In the present instance there are two plows shown attached to this frame. The plows are of the ordinary construction and comprise a plow share 11, a moldboard 12 and a land side 13. The moldboard differs from the moldboards commonly used in plows in that its length from front to rear is only about half the length of an ordinary moldboard, and it of itself in some instances completes the turning over of the soil into the furrow.

Immediately in the rear of the moldboard 12 is an upright shaft 14, upon which there is mounted a series of pulverizing blades 15, so arranged that when the shaft is rotated, these pulverizing blades will engage the ribbon of soil as it passes from the moldboard, and complete the turning of this ribbon of soil over into the furrow, and at the same time pulverize the soil and throw it laterally and downwardly into the furrow.

In use with plows and soil pulverizers just described, the plow share and moldboard cut from the earth a ribbon like layer of soil and turn it up on edge, and then turn it substantially up side down into the furrow, and in this specification where I refer to a ribbon of soil I mean this quantity of soil that is being cut loose, turned on edge and thrown into the furrow.

With plows and soil pulverizers of this character in actual use, I have observed that at times the soil contains clods of large size and so tightly packed or hard that when struck by one of the pulverizer blades, it will not be broken up and pulverized, but will be thrown laterally and downwardly into the furrow without being pulverized. This action also sometimes occurs with tightly packed masses of soil and plant roots and the like.

For the purpose of breaking up and pulverizing all such clods or masses, I have provided a device in the nature of an attachment comprising an upright frame member 16 designed to be placed adjacent to a part of the frame 10 and to be detachably and adjustably clamped thereto by a clevis 17. Fixed to the lower end of the frame member 16 is a series of round rods 18 made of spring material. These rods are extended rearwardly and downwardly, as shown in Figure 1, and laterally as shown in Figure 2, with their central portions spaced laterally from the moldboard 12 and the rear ends spaced laterally from the pulverizing blades 15, as shown in Figure 2. The rear ends of these rods are free and unobstructed so they may move laterally away from the soil pulverizer, and so they will not become caught or entangled in any of the material passing near or between them. These clod holding rods are somewhat similar to the ordinary weed hooks that have heretofore been employed on ordinary plows for the purpose of directing large or tall vegetation downwardly and into the furrow so that the ribbon of soil may be deposited on top of them. However, in the new arrangement and combination of parts herein disclosed these rods will to a certain extent perform the same function as the weed hooks, but in addition to that they perform in combination another and very important function.

In practical use, and assuming that the device is being operated upon earth which contains hard clods or tightly packed masses of roots or soil, then as the plow progresses a ribbon of soil will be turned up on edge and then the blades will strike rapidly upon this ribbon of soil while it is being held in an elevated position by the plow, thereby causing the soil to be pulverized and thrown laterally and downwardly through the clod holding rods. I have observed in practice that when the clods are relatively hard, the blades will not completely break them up and pulverize them on the first impact of the blades upon them, and under such conditions the clod holding rods will prevent these clods from moving laterally away from the pulverizing blades, but will hold said clods temporarily in the path of the pulverizing blades, so that a number of blows by the pulverizing blades is struck upon each clod, and whereby even the hardest clods of soil or the most tightly compacted masses of vegetation will be thoroughly broken up and pulverized, and caused to pass through the clod holding rods or fall into the furrow at the rear of the clod holding rods. By having the rear ends of the clod holding rods inclined slightly downwardly as they pass the pulverizing blades, the clods are thereby moved downwardly as well as rearwardly, so that the blades strike different parts of the clods as the clods move downwardly and rearwardly.

When a stone or other obstruction which cannot be broken up by the pulverizing blades passes between the pulverizing blades, and the clod holder, there is no injurious effect upon the pulverizing blades, because when they engage the surface of the stone, they will force it outwardly, and this pressure upon the stone will cause the clod holding rods to yield laterally and outwardly, thus permitting the stone to pass to the rear of the clod holding rods and drop into the furrow. This action is illustrated in Figure 4 of the drawings.

I claim as my invention:

1. In combination with a plow and a soil pulverizer formed with blades arranged to strike upon the soil while it is in position elevated by the plow, and thereby throw it laterally away from the plow, of a clod holding device supported in spaced relation to the pulverizer blades and shaped to permit the soil elevated by the plow to pass through the space between it and the pulverizer blades and to permit the pulverized soil to be thrown laterally through it, said clod holding device being also shaped to prevent large clods of soil from moving laterally through it and to temporarily support such clods in the path of the pulverizer blades.

2. In combination with a plow and a soil pulverizer formed with blades arranged to strike upon the soil while it is in position elevated by the plow, and thereby throw it laterally away from the plow, of a clod holding device supported in spaced relation to the pulverizer blades and shaped to permit the soil elevated by the plow to pass through the space between it and the pulverizer blades and to permit the pulverized soil to be thrown laterally through it, said clod holding device being also shaped to prevent large clods of soil from moving laterally through it and to temporarily support such clods in the path of the pulverizer blades, said clod holder being yieldable laterally so that stones or the like too large to pass laterally through the clod holder and through the space between the clod holder and the pulverizing blades may be moved laterally by the pulverizing blades, and thereby force the clod holder laterally far enough to permit the clods to pass between the clod holder and the pulverizing blades.

3. In combination with a plow and a soil pulverizer formed with blades to strike upon the soil while it is in position elevated by the plow and thereby throw it laterally away from the plow, of a series of spring rods supported at the side of the plow and extended rearwardly and laterally to position adjacent to the soil pulverizer and spaced laterally from the soil pulverizer, for the purposes stated.

4. In combination with a plow and a soil pulverizer formed with blades to strike upon the soil while it is in position elevated by the plow and thereby throw it laterally away from the plow, of a series of spring rods supported at the side of the plow and extended rearwardly, laterally and downwardly to position adjacent to the soil pulverizer and spaced laterally from the soil pulverizer, for the purposes stated.

Des Moines, Iowa, July 14, 1927.

GUY HERRING HALL.